(12) United States Patent
Hinton et al.

(10) Patent No.: US 8,141,139 B2
(45) Date of Patent: Mar. 20, 2012

(54) FEDERATED SINGLE SIGN-ON (F-SSO) REQUEST PROCESSING USING A TRUST CHAIN HAVING A CUSTOM MODULE

(75) Inventors: Heather Maria Hinton, Austin, TX (US); Patrick Ryan Wardrop, Austin, TX (US); Parley Avery Salmon, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 11/939,749

(22) Filed: Nov. 14, 2007

(65) Prior Publication Data
US 2009/0125972 A1     May 14, 2009

(51) Int. Cl.
*H04L 29/06* (2006.01)
*G06F 7/04* (2006.01)
*G06F 17/30* (2006.01)
*H04L 9/32* (2006.01)

(52) U.S. Cl. ......... 726/8; 726/2; 726/5; 726/9; 709/229; 713/168

(58) Field of Classification Search ......... None
See application file for complete search history.

(56) References Cited

U.S. PATENT DOCUMENTS

| | | | | |
|---|---|---|---|---|
| 6,892,307 B1 * | 5/2005 | Wood et al. | ......... | 726/8 |
| 6,944,761 B2 * | 9/2005 | Wood et al. | ......... | 713/155 |
| 7,039,714 B1 * | 5/2006 | Blakley, III et al. | ......... | 709/229 |
| 2003/0149781 A1 * | 8/2003 | Yared et al. | ......... | 709/229 |
| 2003/0163733 A1 * | 8/2003 | Barriga-Caceres et al. | .. | 713/201 |
| 2003/0200465 A1 * | 10/2003 | Bhat et al. | ......... | 713/202 |
| 2004/0128393 A1 * | 7/2004 | Blakley et al. | ......... | 709/229 |
| 2006/0218630 A1 * | 9/2006 | Pearson et al. | ......... | 726/8 |
| 2007/0184819 A1 * | 8/2007 | Barriga-Caceres et al. | .. | 455/411 |
| 2008/0141341 A1 * | 6/2008 | Vinogradov et al. | ......... | 726/2 |

OTHER PUBLICATIONS

Patterson et al., Federated Identity: Single Sign-On Among Enterprises, Oct. 14, 2004.
Shibboleth Architecture Technical Overview, Jun. 8, 2005.
OASIS SAML Interoperability Lab Demonstrates Single Sign-On for GSA E-Gov's E-Authentication Initiative, Press Release, Feb. 25, 2004.

* cited by examiner

*Primary Examiner* — Shin-Hon Chen
(74) *Attorney, Agent, or Firm* — Jeffrey S. LaBaw; David H. Judson (57) ABSTRACT

Federated single sign on (F-SSO) uses a token service that fulfills requests by executing a module chain comprising a set of modules. F-SSO runtime processing is enhanced by enabling a federated entity user to define a custom module to include in the chain. The custom module includes one or more name-value pairs, wherein a given name-value pair has a value that may be validated against an entity-defined rule. The rule is determined during the processing of the custom module based on one or more invocation parameters of the module chain. In a runtime operation, F-SSO begins in response to receipt of a token. In response, the processing of the module chain that includes the custom module is initiated. During processing of the custom module, an attempt is made to validate the value of a name-value pair based on the rule. If the value of the name-value pair based on the rule can be validated, processing of the module chain continues. This approach enables finer granularity on the information that can be asserted or required as part of an F-SSO flow.

25 Claims, 9 Drawing Sheets

FEDERATED SINGLE SIGN-ON (F-SSO) REQUEST PROCESSING USING A TRUST CHAIN HAVING A CUSTOM MODULE

BACKGROUND OF THE INVENTION

1. Technical Field

The present invention relates generally to management of trust services among participants in a federated environment.

2. Background of the Related Art

Federated environments are known in the art. U.S. Publication No. 2006/0021018, filed Jul.21, 2004, is representative. A federation is a set of distinct entities, such as enterprises, organizations, institutions, or the like, that cooperate to provide a single-sign-on, ease-of-use experience to a user. A federated environment differs from a typical single-sign-on environment in that two enterprises need not have a direct, pre-established, relationship defining how and what information to transfer about a user. Within a federated environment, entities provide services that deal with authenticating users, accepting authentication assertions (e.g., authentication tokens) that are presented by other entities, and providing some form of translation of the identity of the vouched-for user into one that is understood within the local entity. Federation eases the administrative burden on service providers. A service provider can rely on its trust relationships with respect to the federation as a whole. The service provider does not need to manage authentication information, such as user password information, because it can rely on authentication that is accomplished by a user's authentication home domain or an identity provider.

Federation relationships require a trust relationship-based federation between business partners. A trust relationship is represented by the combination of security tokens that are used to exchange information about a user, cryptographic information used to protect these security tokens (and the communications used to broker token exchanges), and optionally identity mapping rules applied to information contained within this token. A trust service provides management of this overall trust relationship, including the binding of a trust relationship to a particular partner.

BRIEF SUMMARY OF THE INVENTION

Federated single sign on (F-SSO) uses a token service that fulfills requests by executing a module chain comprising a set of modules. Here, F-SSO runtime processing is enhanced by enabling a federated entity user to define a custom module to include in the chain. The custom module includes one or more name-value pairs, wherein a given name-value pair has a value that may be validated against an entity-defined rule. The rule is determined during the processing of the custom module based on one or more invocation parameters of the module chain. These module chain invocation parameters include, for example, custom module identity, initial token issuer (i.e. who put information into the token), and the like. In a runtime operation, F-SSO begins in response to receipt of a token, wherein the information in the token is represented as a set of name-value pairs. In response, the processing of the module chain that includes the custom module is initiated. During processing of the custom module, an attempt is made to validate the value of a name-value pair based on the rule. As noted above, preferably the rule is dynamically selected based on the module chain's invocation parameters. If the value of the name-value pair based on the rule can be validated, processing of the module chain continues. Upon successful completion of the chain, a response token is returned.

In an illustrative embodiment, a custom module is pre-defined and pre-configured into a module chain. When the custom module is invoked during the processing of the module chain, a value within a name-value pair of the custom module is validated against one or more rules that are dynamically configured based on the invocation parameters of the module chain. This approach enables finer granularity on the information that can be asserted or required as part of an F-SSO flow.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 illustrates trust service processing for federated single sign-on;

DETAILED DESCRIPTION OF AN ILLUSTRATIVE EMBODIMENT

Generally, the subject matter described herein operates in conjunction within the standard client-server paradigm in which client machines communicate with an Internet-accessible Web-based portal (or, more generally, target server or site) executing on a set of one or more machines. End users operate Internet-connectable devices (e.g., desktop computers, notebook computers, Internet-enabled mobile devices, cell phones having rendering engines, or the like) that are capable of accessing and interacting with the destination. Typically, each client or server machine is a data processing system comprising hardware and software, and these entities communicate with one another over a network, such as the Internet, an intranet, an extranet, a private network, or any other communications medium or link. As described below, a data processing system typically include one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed in the following discussion.

Figure 1:
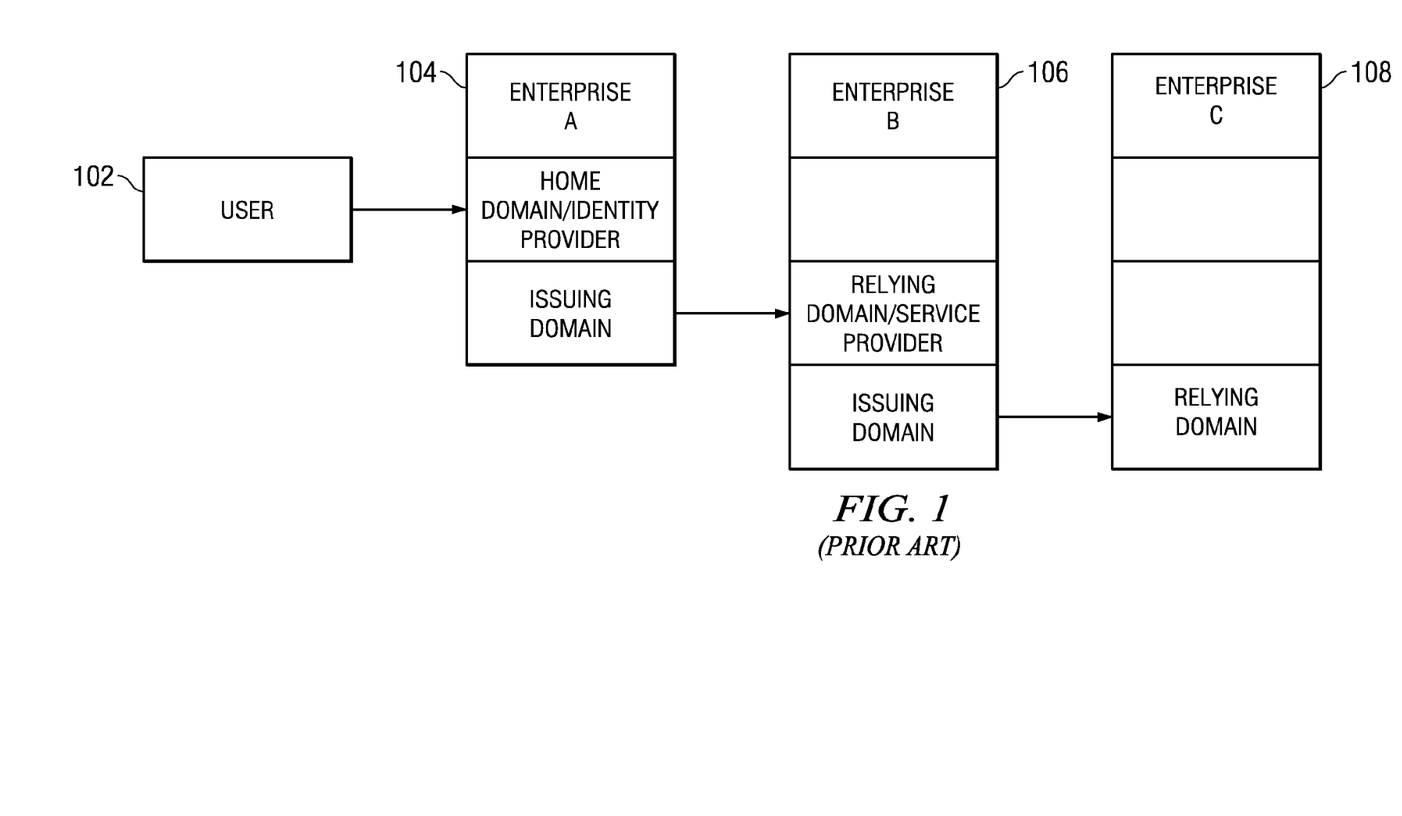
FIG. 1 depicts a known federated environment.

With reference now to FIG. 1, a block diagram depicts a federated environment with respect to a transaction that is initiated by a user to a first federated enterprise, which, in response, invokes actions at downstream entities within the federated environment. FIG. 1 illustrates that the federated environment supports transitivity of trust and transitivity of an authentication assertion process; in particular, a given domain can issue an assertion based on its trust in an identity as asserted by another domain. In this example, User 102 initiates a transaction through a request for a protected resource at enterprise 104. If user 102 has been or will be authenticated by enterprise 104 during the course of a transaction, then enterprise 104 is the user's home domain, i.e. the user's identity provider, for this federated session. Assuming the transaction requires some type of operation by enterprise 106 and enterprise 104 transfers an assertion to enterprise 106, then enterprise 104 is the issuing domain with respect to the particular operation, and enterprise 106 is the relying domain for the operation; in other words, enterprise 106 is the service provider for the current transaction. Assuming the transaction requires further operations such that enterprise 106 transfers an assertion to enterprise 108, then enterprise 106 is the issuing domain with respect to the requested operation, and enterprise 108 is the relying domain for the operation; in this case, enterprise 108 may be regarded as another downstream service provider, although a federated transaction can usually be described as involving only two domains, the identity provider and the service provider.

The federated environment provides for federated identity management (FIM), wherein typically different organizations assume the role of an identity provider or a service provider. These roles are not necessarily mutually exclusive. An identity provider is an organization that directly manages end users. It acts as the authoritative source for issuing and validating user identities and network credentials for a set of users; thus, an identity provider "owns the user relationship." For example, many companies act as identity providers for employees, customers, and contractors. Identity providers "vouch" for the user identity and their entitlements in a federated interaction with service providers. The "identity provider" role can be thought of as an authentication authority. A service provider provides "services" for end users. A service provider typically does not have a vested business interest in managing the user. Thus, service providers act as a "relying party" to validate credentials issued by a trusted identity partner, on the basis of which they provide services to that trusted identity.

Figure 2:
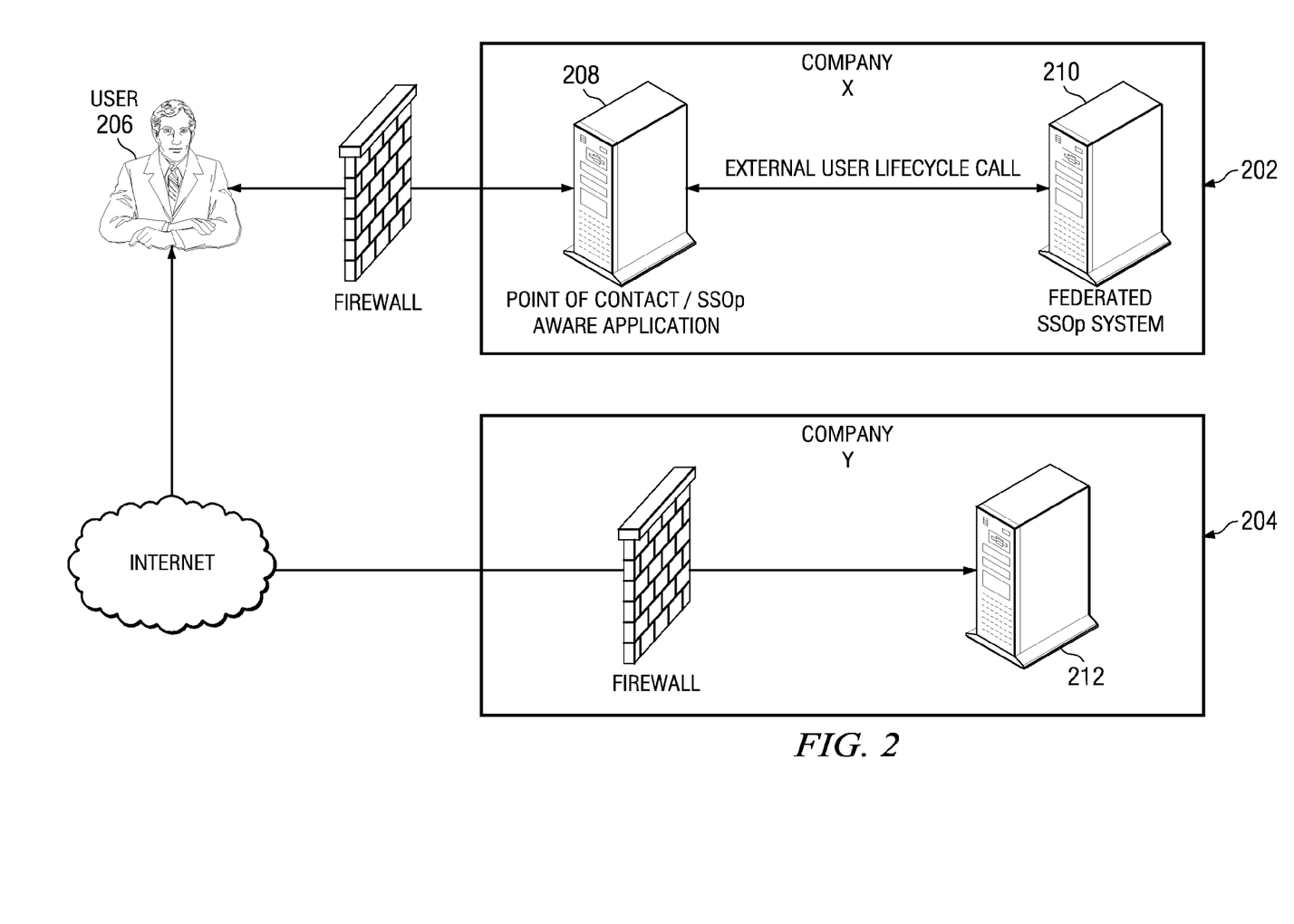
FIG. 2 depicts how a service provider may be used to provide federated identity management in the federated environment of FIG. 1.

FIG. 2 illustrates this approach. In this example, there are two distinct entities, Company X 202, and Company Y 204. Of course, a federated environment may include any number of entities or organizations. A user 206 (or, more specifically, a browser associated with the user) accesses Company X through a point of contact 208. The point of contact 208 typically executes at least one single sign on protocol (SSOp)-aware application, such as an access manager like Tivoli® Access Manager, which is available commercially from IBM. That application has the capability of communicating with federated SSOp system 210. An example of such a system is the Tivoli® Federated Identity Manager product, which is also available commercially from IBM. Of course, the identification of these commercial products is merely for purposes of explanation, and it is not meant to be taken to limit the present invention. The system 210 and, in particular, the FIM functionality, has the capability of serving as an identity provider (to facilitate, among other services, authentication), or as a service provider. Company Y 204 is a participant in the federation and typically operates its own computing entities, such as system 212. In a typical case, Company Y's system 212 operates as a service provider within the context of the federated scheme.

Federation relationships require a trust relationship-based federation between business partners. A trust relationship typically is represented by the combination of security tokens that are used to exchange information about a user, cryptographic information used to protect these security tokens (and the communications used to broker token exchanges), and optionally identity mapping rules applied to information contained within this token. Typically, a trust service provides management of this overall trust relationship, including the binding of a trust relationship to a particular partner. As part of this trust relationship management, a trust service provides a means of managing one's own keys and certificates (through a key service), and of binding a business partners' certifications (typically validated by a third party certificate authority) to a local, business-agreement validated, business partner identity. These keys and certificates are then used to sign/validate and encrypt/decrypt messages between business partners, independent of any transport layer security. These services provide a trust infrastructure over which other federation services are layered.

Figure 3:
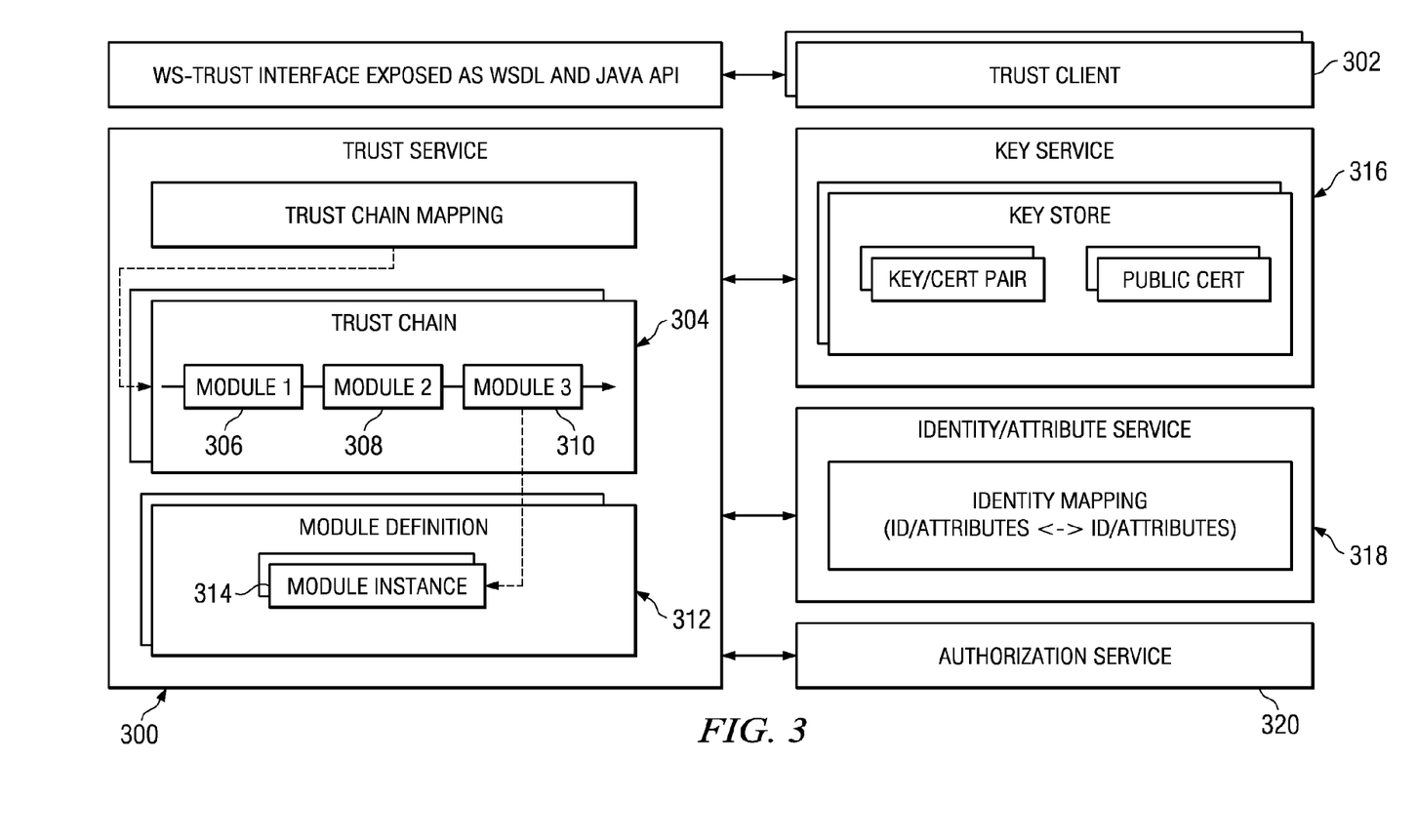
FIG. 3 depicts logical components and connections of a federated identity manager (FIM) trust service in which the subject matter described herein may be implemented.

Trust services typically require more than the just the management of cryptographic elements. This is because trust relationships are also bound to security tokens exchanged between business partners. Security tokens typically are managed by a security token service (STS). Within a Federated Identity Manager (TFIM), for example, the security token service typically is implemented as a logical service contained within a trust management service. FIG. 3 illustrates the logical components and connections of a representative federated identity manager (FIM) trust service 300 in which the subject matter described below may be implemented. As noted above, the trust service 300 performs security token related functions, such as token creation, validation, and exchange, and it does authorization for Web services. The trust service is accessed by trust clients 302 using either SOAP requests or direct JAVA API calls.

Preferably, all trust service functionality is performed by chains of one or more modules. One trust chain is illustrated at reference numeral 304 and comprises modules 306, 308 and 310. Typically, there are modules that can process incoming tokens, modules that create tokens, modules that perform identity mapping, and modules that perform authorization. A trust chain typically starts with a validation (V) module, and the chain typically ends with a token issuance (I) module. One or more other modules (e.g., for mapping, authorization, and the like) may be including within the chain. As will be described below, an aspect of the subject matter described below is that one or more "custom" modules may be included within a particular trust chain to enable federation partners to have more flexibility in setting up and managing their security token service. Referring back to FIG. 3, a module definition 312 points to an implementation of a module, and a module instance 314 contains the specific configuration. Trust service modules 306, 308 or 310 can make calls out to other FIM components. For example, most token modules call the key service 316 for signature creation and validation. Some other modules (e.g., ID-FF profiled SAML assertion) call out to the identity/attribute service 318 for alias lookup. Still other modules (e.g., credential and authorization) call out to an authorization service 320.

When exchanging security tokens with partners, typically it is not sufficient to simply understand the different token standards. It is also important to know what information a particular partner is expecting in tokens from another's site, and what information the site should expect to receive from the partner. For example, two different partners in the same federation might format a user account number in two different ways, and they might use a different attribute in the security token to exchange it. For example, both partners may use the same token standard (such as SAML 1.1), but the information in the token may be different. Preferably, an FIM trust service includes a flexible identity mapping function that allows it to exchange tokens using a different identity mapping rule with each partner. The trust service mapping module is called to perform the mapping, and it looks up the configured identity mapping for the partner in question. Information from the incoming token can be manipulated and mapped into the outgoing token in any way required.

Figure 4:
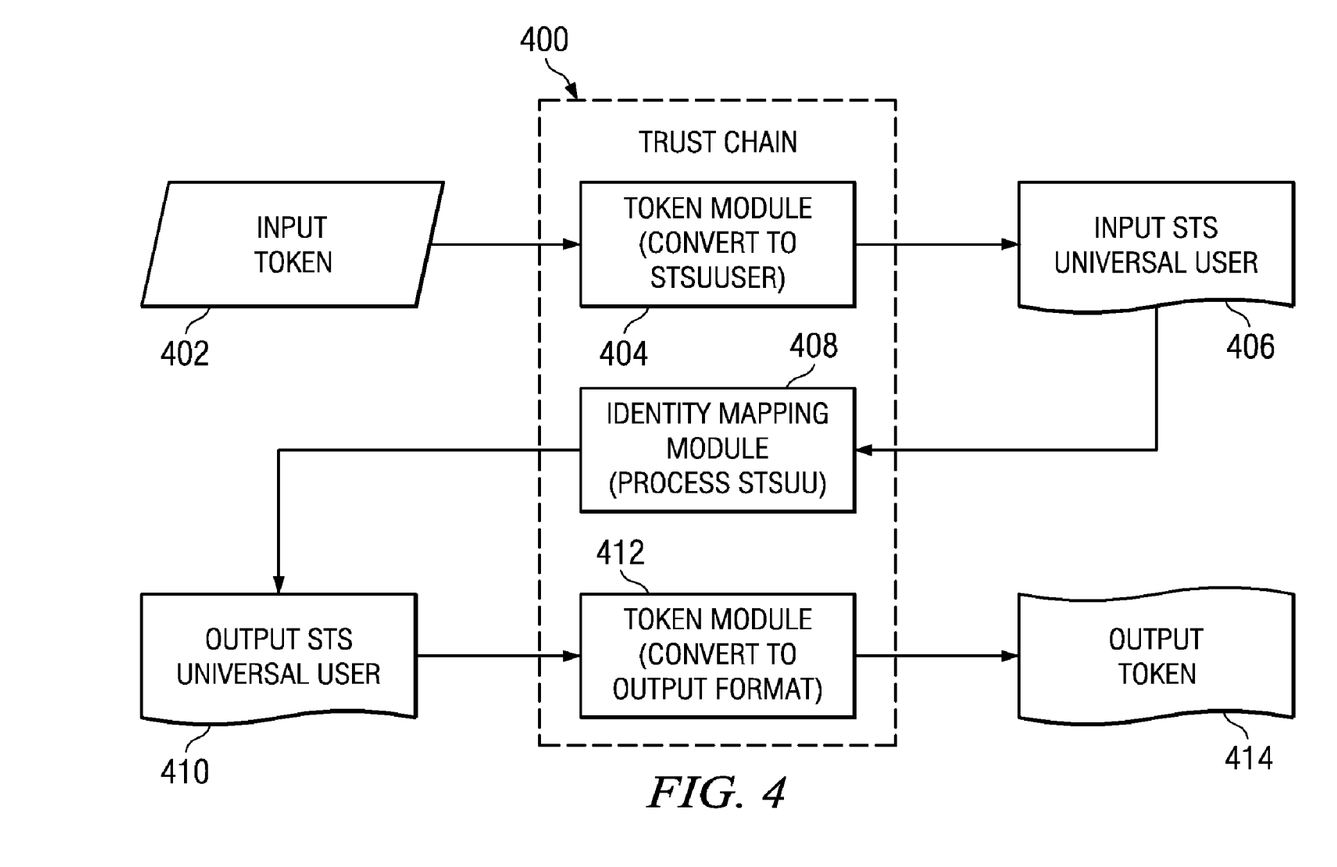

The trust service may use an abstract (i.e. an internal) format for identity information. In an TFIM embodiment, this common, internal token representation is an XML document called the STS Universal User, and it includes three (3) sections: one for principal information, one for group information, and one for attribute information. The reference to TFIM should not be taken to be limiting, as the subject matter herein is not limited to any specific federated identity manager or format. In a standard SSO trust chain, an incoming token is converted to this format, an identity mapping is performed, and then an outgoing token is created. FIG. 4 illustrates this trust service processing for federated single sign-on (F-SSO) in more detail. In particular, this drawing illustrates how the trust service performs a token exchange. The trust chain 400 is used for all federated SSO operations, and the chain typically is created automatically when a partner configures the F-SSO operation. As seen in FIG. 4, the input to the trust chain 400 is an input security token 402. The first module 404 in the trust chain converts the input token to the common, internal token representation. This creates an XML document 406 with known structure. All of the attributes from the incoming token are available in the document 406. These attributes include, without limitation, a set of name-value pairs, as will be described in more detail below. The token representation document 406 is used as an input to an identity mapping module 408. The mapping used by the identity mapping module 408 is particular to a federation partner and thus is tailored to the particular attributes and information formats used by that partner. The output of the mapping module 408 is another token representation document 410, one that is suitable for creation of an outgoing token (or another mapping module or other trust chain module). The output document 410 is converted into the output token 414 by the final token module 412.

The Federated Identity Manager (FIM) provides an implementation of the Web Services Trust Language (WS-Trust) specification that allows it to exchange, issue, and validate security tokens of varying formats. As shown in FIG. 4, when an incoming request is received, a trust server uses a policy-based mechanism to select an appropriate series of modules (the module chain) to process the request, and to return a response. Modules in general and module chains in particular allow the FIM to abstractly understand several different security token types and to convert between them. The FIM, for example, may provide native support for a known set of credentials, such as SAML 1.0, Liberty 1.1/1.2, a Tivoli Access Manager credential, and a username-password token, or it may enable an enterprise to require custom security tokens. In addition to security token modules, a trust server in the STS typically supports other types of modules that act upon information received from the upstream chain.

Figure 5:
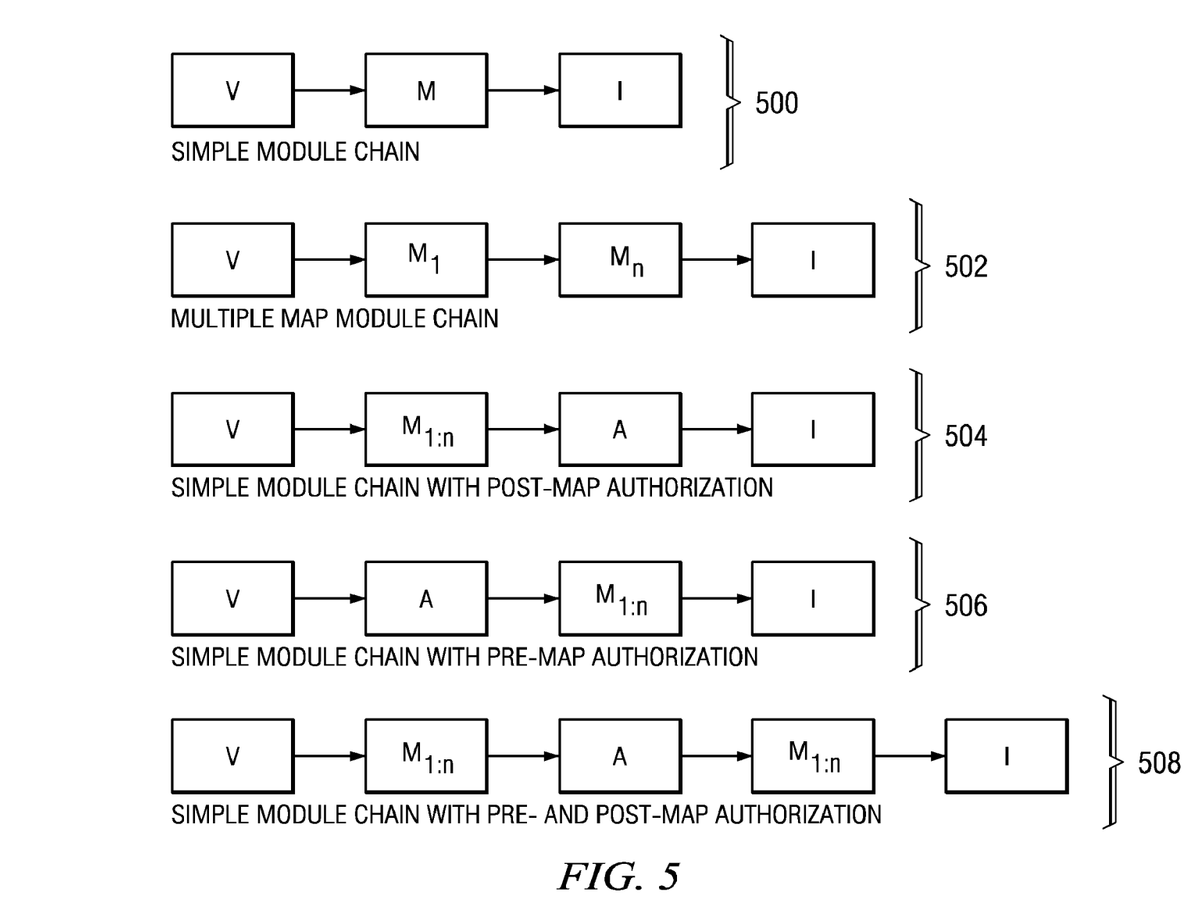
FIG. 5 illustrates a number of representative module chains.
Figure 6:
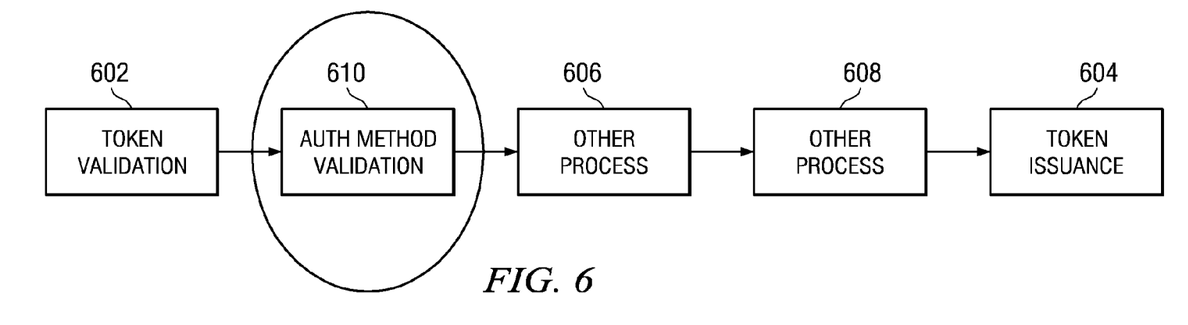
FIG. 6 illustrates a method of customized F-SSO by enabling the enforcement of fine-grain processing of one or more rules within a given trust chain.

The interface to the STS is a WS-Trust Request Security Token element. All requests typically end with a corresponding Request Security Token Response element. Upon receiving a request, the Security Token Service uses the Issuer and Applies To elements of the request to select the appropriate module chain used to process the request. FIG. 5 and FIG. 6 illustrate the XML request-response flow from the Web service client to the WS-Trust end point provided by Federated Identity Manager.

Modules typically conform to a set of rules. Thus, typically each module is stateless and atomic. A federated identity manager typically creates one module instance for each module chain, and it also provides the necessary configuration and context for each request. As described above with respect to FIG. 4, each module preferably implements an interface called STS Module. In particular, for each applicable request, the trust server passes context information and the requested mode (validate, exchange, or issue). As each module in the chain processes the token, it can place context information in a request object called STS Request to provide information to downstream modules. Attributes placed in the STS Request persist for the life of the request; the request object is cleared for each request. Modules performing validate or issue operations typically return results in an intermediate format, called the STS Universal User. The STSU Universal User is an intermediate format (for either populating the object or consuming information contained within the object). This format allows all modules in the module chain to contribute information to the response, and it allows the trust server to put appropriate information into the response. Preferably, the STS Universal User is represented as both a Java™ Bean technology and an XML document. Preferably, each instance of STS Universal User also provides principal information, group membership information, and attribute information. Each attribute preferably is a tuple of name, value, and type.

The Validate and Issue modules tend to be modules that are token specific, such as Username Token, X509 or SAML. The Map module typically runs as an XSL style sheet. In a representative embodiment, the FIM STS calls the access manager and performs credential mapping. In particular, FIM STS receives a WS-Trust request from a login module in an application server hosting a JDBC application. In this example, this request contains a Username token representing the user logged into application server. The chain then uses the security token service to map the credential. A resulting new credential is passed back as a Username token with a username and plaintext password.

Figure 7:
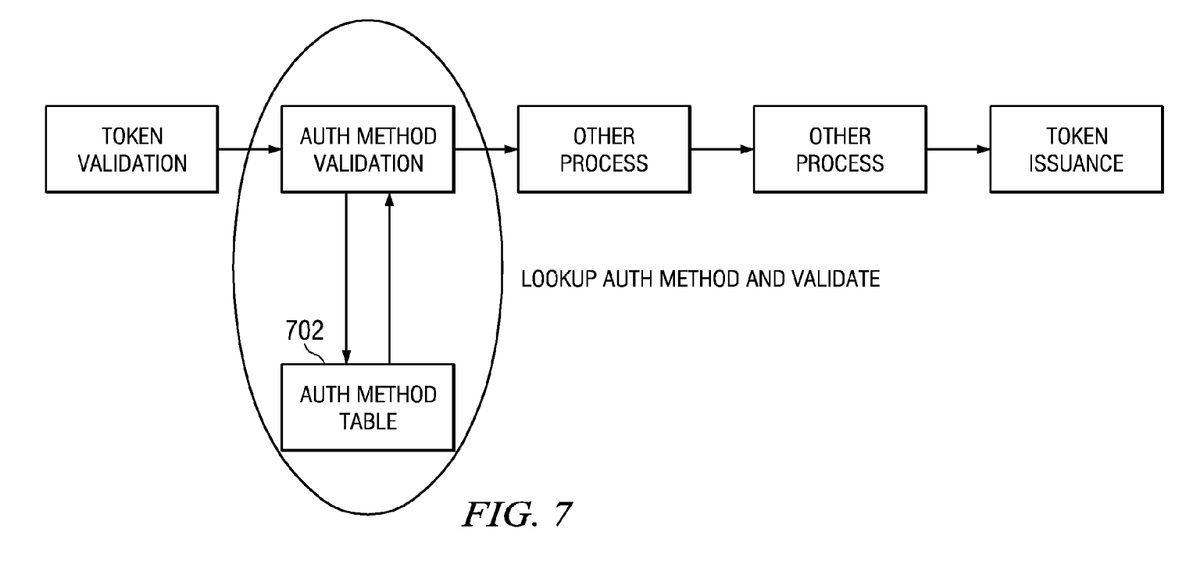
FIG. 7 illustrates how a custom module performs an authentication method validation using an external call to an authentication method table.
Figure 8:
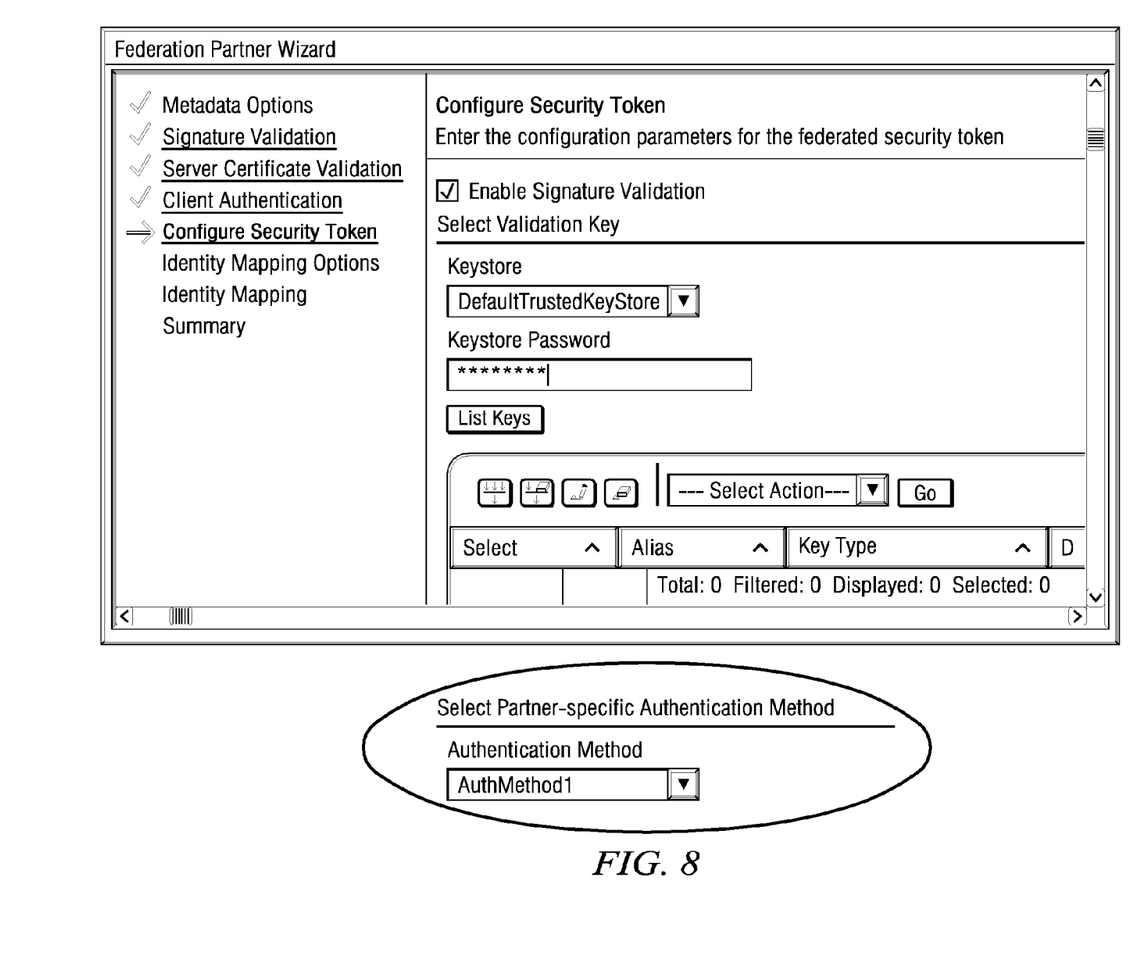
FIG. 8 is a portion of a representative user interface display by which a user can specify a partner-specific authentication method.

Module chains are not limited to the format shown in FIG. 4. FIG. 5 illustrates several representative module chains. Thus, the first chain 500 is a simple module chain that comprises validate (V) module, mapping (M) module, and token issuance (I) module. The second chain 502 is a multiple map module chain comprising a validate module, a first mapping module, a second mapping module, and a token issuance module. Third chain 504 is a simple module chain with post-map authorization. This chain comprises a validate module, one or more mapping modules, an authorization module, and a token issuance module. The fourth trust chain 506 is a simple module chain with pre-map authorization; this chain comprises a validate module, an authorization module, one or more mapping modules, and an issuance module. The last trust chain 508 is a simple module chain with both pre- and post-map authorization. This chain comprises a validate module, one or more mapping modules, an authorization module, one or more additional mapping modules, and an issuance module. Information from a partner is passed through a chain.
Custom Modules With TFIM, it is desirable to provide an enterprise user with the ability to add customization to the federated single sign-on (F-SSO). This customization includes validation of a custom token, customized identity/attribute retrieval and mapping, and issuance of customized tokens. The present invention provides customized F-SSO by enabling the enforcement of fine-grain processing of one or more rules within a given trust chain. This concept is illustrated in FIG. 6. Here, a trust chain comprises a token validation module 602 at one end, and a token issuance module 604 at the other. One or more other process modules 606 and 608 are intermediate the validation and issuance modules, as previously explained. According to the subject matter herein, an additional "custom" module 610 (in this example, an authentication method validation module) is positioned with the trust chain to provide for more fine-grain, rules-based control. Thus, for example, as illustrated in FIG. 7, the authentication method validation may make an external call to an authentication method table 702 to perform an authentication lookup and validation. If validation fails, then the authentication method validation module may return an error. FIG. 8 is a user interface by which a user can specify a partner-specific authentication method. In one embodiment, a user configures (e.g., via a TFIM-ISC console or other interface) one or more optional hook points to provide finer granularity on information (such as an authentication method) that can be asserted or required as part of an F-SSO flow. In response to the hook point, the federated identity manager may generate a file containing, for example: a partnerID, a partner name, and an assertion element that can be managed. Thus, in one example, for granularity of authentication method, a file might be generated containing the following data:

| partnerID | partnerName | AuthenticationMethod |
|---|---|---|
| https://idpprovider.com | IDPProvider | |
| https://bob.com | Bob's Co | |
| ... | | |

The authentication method data may not be filled in this form/file/table upon an initial configuration. Preferably, this is done in a later step, either manually or through an additional ISC-based GUI. The result of editing this file (however it is done) may generate this file:

| partnerID | partnerName | AuthenticationMethod |
|---|---|---|
| https://idpprovider.com | IDPProvider | StrongAuth; TAMLevel2 |
| https://bob.com | Bob's Co | X509 |
| https://jane.com | Jane's Co | Username |
| ... | | |

Thus, this file states that as part of F-SSO, users from IDP-Provider must have an authentication method representing strong authentication or TAM Level2, users from Bob's Company must have an authentication method of X509, and users from Jane's Company must have an authentication method of Username. If managed "manually," an administrator preferably is responsible for editing the file and typing in the required authentication methods. If managed through an (e.g.,ISC-based) GUI (such as shown in FIG. 8), the administrator may select the appropriate authentication methods from a supplied list, or may additionally define new authentication methods.

Of course, the above authentication method table is merely illustrative. During the processing of a trust chain as part of the F-SSO fulfillment, the federated identity manager is configurable to check finer levels of granularity and to do a lookup against this table, in this case using the provided partnerID (in an SAML environment, this will be the Issuer). If the authentication method asserted in the SAML assertion matches that configured for the partner, then the processing of the trust chain (e.g., the SAML validation module) continues. If the authentication method does not match, however, then the processing throws a (e.g., Java) exception with an error identifying the failure to match the authentication methods. According to the invention, a customized user error flow also can be implemented if desired. Thus, one example would be a Javascript that when executed generates an error that is then presented to the user; alternatively, the script submits a new F-SSO request to the identity provider, wherein the new request specifies the required authentication method. In the latter case, i.e., where there are multiple allowed authentication methods, the new request may identify a weaker authentication method. This operation provides a second F-SSO (typically invisible to the user) that (ideally) results in a successful single sign-on, so that the user has the appropriate user experience.

Figure 9:
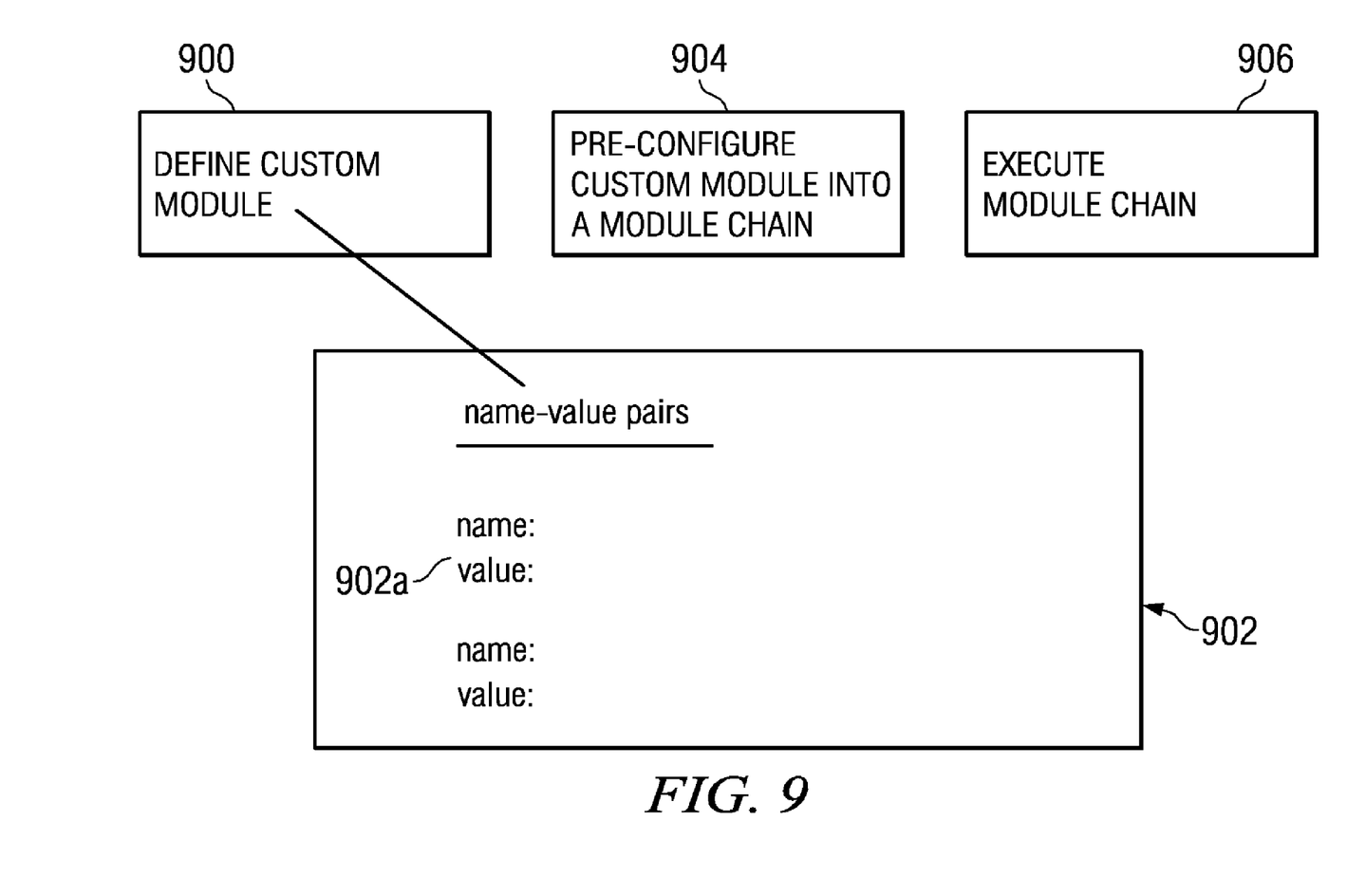
FIG. 9 illustrates how a custom module is defined and executed according to the subject matter herein.

The fine-grain processing of one or more rules within a given trust chain is implemented within a "custom" module. As will be seen below, as used herein the term "custom" refers to the ability of the module to validate a "value" of a given name-value pair during processing of the module chain that includes the custom module, where the validation is based on a rule. Preferably, the rule is determined based on one or more invocation parameters of the module chain. FIG. 9 illustrates the process at a high level. The process begins at step 900 by pre-defining a custom module, typically in an off-line manner. The custom module includes a set of name-value (n-v) pairs 902a-n that are associated with a given token definition. A given name-value pair comprises a "name" and a "value." At step 904, the predefined custom module is pre-configured into a module chain. At step 906, the module chain is executed.

Figure 10:
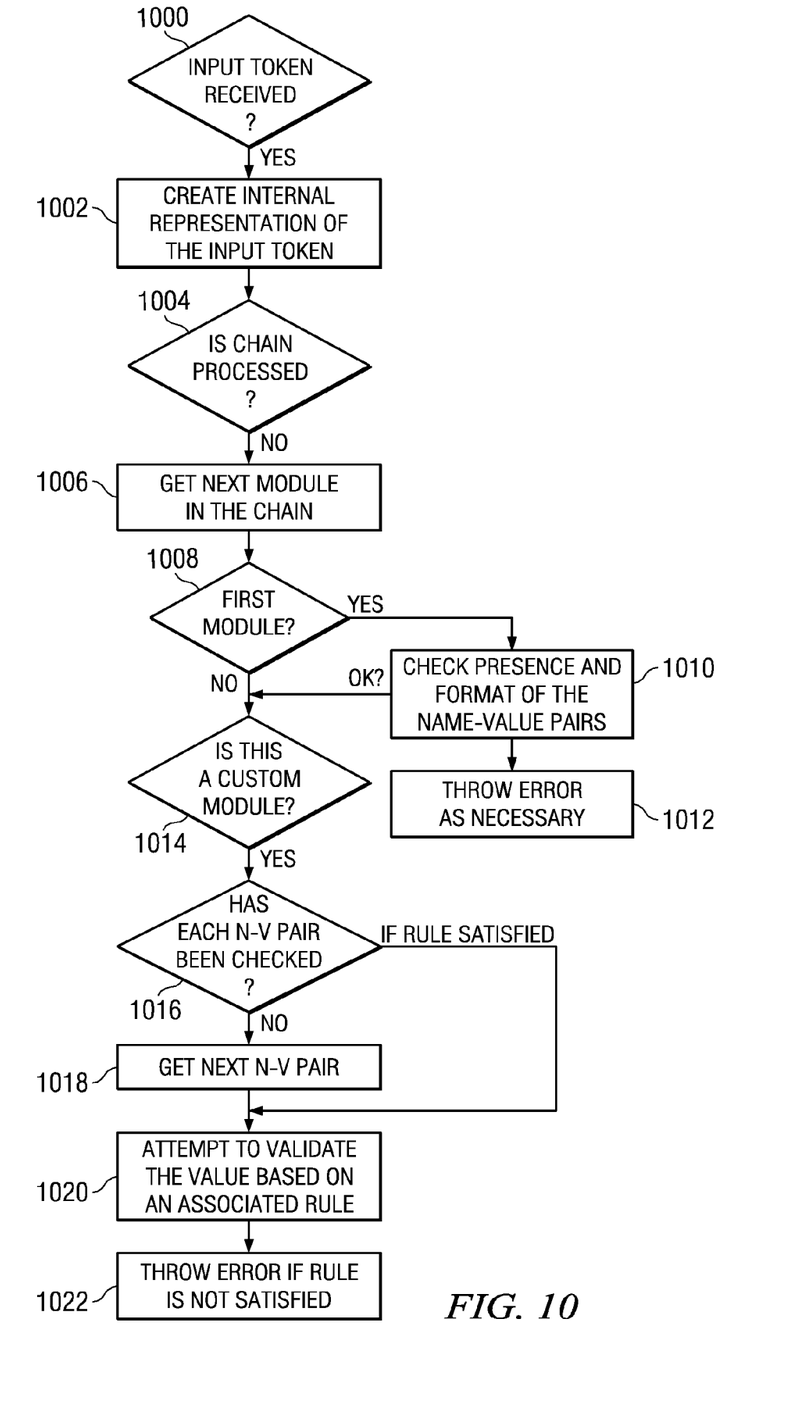
FIG. 10 illustrates a runtime operation of a module chain.

FIG. 10 illustrates a runtime operation of the module chain. At step 1000, a test is performed to determine whether an input token has been received. If not, the routine cycles. If the outcome of the test at step 1000 is positive, an input token has been received and the routine continues at step 1002 to create a representation of the input token. Although step 1002 (converting the token into a representation is not required), it is preferred. As described above, one such representation is the STS Universal User XML document. The internal representation is useful is an enables the module chain to process the input token regardless of the token's type or format. As shown in FIG. 4, the internal formal is manipulated by the module chain, with the resulting output later transformed back into some output format, such as an output token. The representation comprises a set of one or more name-value pairs. A given name-value pair may be single-valued, multi-valued, or embody some other complex format or structure.

A test is run at step 1004 to determine whether the chain has been completely processed. If not, the routine continues at step 1006 to get a next module in the module chain. At step 1008, a test is performed to determine if the next module is a first module in the chain. As noted above, the first module typically is a validate module. If the outcome of the test at step 1008 is positive, the routine checks the format of the name-value pairs and the presence of the required name-value pairs. This is step 1010. Typically, the format of the name-value pairs, as well as the definition of the required name-value pairs, is determined by a token definition. For example, an SAML token has a defined set of expected name-value pairs that must be included for the token to be SAML-compliant; most standard or otherwise interoperable tokens likewise have some form of predefined structure. Likewise, even if a custom token format is being used, the expected format of the token is required to be known so that the token can be represented internally. Referring back to FIG. 10, if the required name-value pairs are not present in the first module, the routine throws an error and the processing ends. This is step 1012. If, however, the required name-value pairs are present in the first module, or if the outcome of the test at step 1008 indicates that the next module is not the first module, the processing continues at step 1014. At this point, a test is run to determine whether the next module is the custom module. If the outcome of this step is positive, the routine continues at step 1016. In particular, at step 1016 a test is run to determine whether each name-value pair in the custom module has been examined. If not, the routine continues at step 1018 to get a next name-value pair in the custom module. At step 1020, the routine performs a test to attempt to validate the value based on an associated rule, where the rule preferably is identified based on module chain invocation parameters. These module chain invocation parameters include, for example, custom module identity, initial token issuer (i.e. who put information into the token), and the like. Preferably, the rule is dynamically selected based on the module chain's invocation parameters. If the rule is not satisfied, the routine throws an error at step 1022. If, however, the rule is satisfied, control returns back to the custom module and step 1016. In particular, a next name-value pair in the custom module is processed. Once all name-value pairs in the custom module are processed, the outcome of the test at step 1016 is affirmative, and a next module in the module chain is considered.

As noted above, the last module in the module chain is an output module. Once that module is executed, a response is generated. Typically, the response must first be transformed into an output format, as has been described previously with respect to FIG. 4. The response is then returned to complete the processing.

Thus, according to an illustrative embodiment, a custom module is predefined and pre-configured into a module chain. When the custom module is invoked during the processing of the module chain, a value within a name-value pair of the custom module is validated against one or more rules that are dynamically configured based on the invocation parameters of the module chain. Thus, for example, if the module chain is invoked by parameters indicating that (for example) a user from Partner X is attempting to F-SSO to the environment, the Partner X module chain is invoked. According to an illustrative embodiment, it is assumed that the custom module within that module chain has been configured. The custom module then looks up the one or more rules associated with Partner X users, where the rules further specify that a Partner X user must authenticate with either a SecureID token or an X509 certificate. The custom module chain then uses this information to check the name-value pair (in this example, "authMethod=username"). In this case, the value fails the rule and an error is thrown. This error could be a fatal error that does not allow the user to F-SSO at all, or it could be a non-fatal error that allows the user to have a "public" or "anonymous" user session (perhaps with a further optional notice that the user must authenticate in a given manner to be granted access to the system).

The custom module is configured (in this example) as part of a configuration of the partner, i.e., when defining information about how the partner communicates to the system (via the federation), and what information the partner's user are expected to provide to facilitate the F-SSO. During this configuration, the operator sets up one or more rules, e.g., "expect Partner X to send users authenticated with SecureID tokens or X509 certificates" or "expect Partner X to send a user with a passport expiration date of x months from date of token processing" or the like. Of course, these rules (and the rule semantics or grammar) are merely illustrative. One of ordinary skill in the art can appreciate that this functionality is quite flexible in that it allows rules to be configured across different custom modules or module chains. In this way, a repository of rules can be created and managed, and a given rule may be re-used with multiple partners.

Note that the above-described approach can be implemented with a single file/table for all information regarding the authentication method, or tables on the granularity of federations (so that providerIDs that exist in multiple federations are replicated across multiple tables) and so on. In addition, this approach is not limited for use with authentication method tables, as it can be used with any parameter that has multiple possible values (e.g., Audience Restriction), as well as attributes that are asserted in an attribute statement.

Among other advantages, the custom module processing herein does not alter the standard F-SSO protocol, nor does it interfere with or impact TFIM interoperability with other F-SSO protocol implementations.

The custom module may be implemented in the context of a dynamic chain. The notion of dynamic chaining refers to the technique of selecting a module chain for processing based on a combination of the token type, the token issuer, and a request destination. Module chain processing (such as described generally above) works quite well if a destination can insist that all requesters provide the required token type in a request. As this is not always possible, a dynamic chain allows different requestors (perhaps with individual token types) to have those tokens processed (i.e., validated, optionally mapped/authorized, and so forth) and then have the module chain associated with the requested destination invoked so that the required destination token type is produced. In one "fan in" approach, a set of different token issuers can issue their particular token types, have the processing for that token type handled by their specific front-end module chain, and then have all of their processing chains be "completed" by a single destination specific module chain "tail." This also has the advantage that a token issuer can issue one and only one token type and have that type used to access multiple destinations, each with its own destination specific token processing.

The techniques of the subject disclosure thus may be applied in the context of a dynamic chain, where the custom module is located anywhere within the chain. Thus, for example, a rule can be used to do the name-value validation within the context of a dynamic chain, even where the name-values have no impact on the dynamic chain selection (in other words, where the dynamic module is part of the module front end, based on the issuer). Alternatively, the dynamic module may be placed within the tail of the dynamic module, chain, so that different rules can be applied to the name-value pairs received from an issuer, e.g., based on the destination requirements. Thus, for example, a rule may say that, for one destination, the user authentication method required is a first scheme, whereas, for a different destination, the user authentication method required is a second scheme. Of course, these are merely representative examples, as the particular placement of the custom module within the dynamic chain will vary depending on application.

More generally, the invention can take the form of an entirely hardware embodiment, an entirely software embodiment or an embodiment containing both hardware and software elements. In a preferred embodiment, the invention (comprising the client side functionality, the server side functionality, or both) is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The transform and related functions may also be implemented as a service.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "token" may be generalized to refer to any data string, blob or message. As used herein, a "token service" may be a security token service (STS), or some other service, however designated.

The invention claimed is:

1. A method, operative within a federated environment in which a token service fulfills requests by executing a module chain comprising a set of modules, comprising:
responsive to receipt of a token, initiating processing of the module chain within a data processing system;
during processing of the module chain within the data processing system, attempting to validate a value of a name-value pair based on a rule, wherein the rule is determined based on one or more invocation parameters of the module chain; and
returning a response.

2. The method as described in claim 1 wherein the value of the name-value pair is attempted to be validated upon execution of a custom module within the module chain.

3. The method as described in claim 2 wherein the rule is associated with the custom module in an off-line process.

4. The method as described in claim 2 wherein the invocation parameters of the module chain include an identity of the custom module and an issuer of the token.

5. The method as described in claim 1 wherein, if the value of the name-value pair is validated, the response is an output token.

6. The method as described in claim 1 wherein, if the value of the name-value pair cannot be validated, the response is an error.

7. The method as described in claim 1 wherein, if the value of the name-value pair cannot be validated, the response is a condition authorization.

8. The method as described in claim 1 wherein the rule identifies a condition that must be satisfied by a user of a first entity attempting to execute a federated single sign-on (F-SSO) to the federated environment.

9. The method as described in claim 8 further including re-using the rule for a user of a second entity.

10. The method as described in claim 1 further including:
generating an internal representation of information in the token; and
evaluating the internal representation to determine if all name-value pairs expected to be in the token are contained within the token;
wherein the evaluating step is performed on a name of each name-value pair.

11. The method as described in claim 1 wherein the value in the name-value pair is associated with a single value or a multi-value.

12. The method as described in claim 1 wherein the module chain is a dynamic chain.

13. A method, operative within a federated environment in which a token service fulfills requests by executing a module chain comprising a set of modules, comprising:
defining a custom module to include one or more name-value pairs, wherein a given name-value pair has a value that may be validated against a rule;
responsive to receipt of a token, initiating processing of the module chain that includes the custom module within a computing entity;
during processing of the custom module within the computing entity, attempting to validate the value of a name-value pair based on the rule, wherein the rule is determined during the processing of the custom module based on one or more invocation parameters of the module chain; and
returning a response.

14. The method as described in claim 13 wherein the invocation parameters are one of: an identity of the custom module, and an identity of token issuer.

15. The method as described in claim 13 wherein the token is received upon a user of a first entity attempting a federated single sign-on (F-SSO) to the federated environment.

16. The method as described in claim 13 further including:
generating an internal representation of information in the token; and
evaluating the internal representation to determine if all name-value pairs expected to be in the token are contained within the token;
wherein the evaluating step is performed on a name of each name-value pair.

17. A computer program product for use in a federated environment in which a token service fulfills request by executing a trust chain comprising a set of modules, comprising:

a non-transitory computer-readable medium having computer program instructions that, when executed by a data processing system, perform the following steps:

responsive to receipt of a token, initiating processing of the module chain;

during processing of the module chain, attempting to validate a value of a name-value pair based on a rule, wherein the rule is determined based on one or more invocation parameters of the module chain; and returning a response.

18. The computer program product as described in claim 17 wherein the value of the name-value pair is attempted to be validated upon execution of a custom module within the module chain.

19. The computer program product as described in claim 17 wherein, if the value of the name-value pair is validated, the response is an output token.

20. The computer program product as described in claim 17 wherein, if the value of the name-value pair cannot be validated, the response is an error.

21. The computer program product as described in claim 17 wherein, if the value of the name-value pair cannot be validated, the response is a condition authorization.

22. The computer program product as described in claim 17 wherein the invocation parameters of the module chain include an identity of the custom module and an issuer of the token.

23. A data processing system for use in a federated environment in which a token service fulfills requests by executing a module chain comprising a set of modules, comprising:

a processor;

computer memory holding computer program instructions that, when executed by the processor, perform the following operations:

defining a custom module to include one or more name-value pairs, wherein a given name-value pair has a value that may be validated against a rule;

responsive to receipt of a token, initiating processing of the module chain that includes the custom module;

during processing of the custom module, attempting to validate the value of a name-value pair based on the rule, wherein the rule is determined during the processing of the custom module based on one or more invocation parameters of the module chain; and returning a response.

24. The data processing system as described in claim 23 wherein the invocation parameters are one of: an identity of the custom module, and an identity of token issuer.

25. The data processing system as described in claim 23 wherein the operations further include:

generating an internal representation of information in the token; and evaluating the internal representation to determine if all name-value pairs expected to be in the token are contained within the token;

wherein the evaluating step is performed on a name of each name-value pair.

* * * * *